United States Patent [19]
Williamson et al.

[11] Patent Number: 5,613,559
[45] Date of Patent: Mar. 25, 1997

[54] DECENTRALIZING CENTRALIZING LOCATING AND ORIENTING SUBSYSTEMS AND METHODS FOR SUBTERRANEAN MULTILATERAL WELL DRILLING AND COMPLETION

[75] Inventors: Jimmie R. Williamson; John C. Gano, both of Carrollton; David L. Reesing, Irving, all of Tex.

[73] Assignee: Halliburton Company, Dallas, Tex.

[21] Appl. No.: 513,149

[22] Filed: Aug. 9, 1995

Related U.S. Application Data

[63] Continuation of Ser. No. 380,768, Jan. 30, 1995, which is a continuation-in-part of Ser. No. 296,941, Aug. 26, 1994.
[51] Int. Cl.$^6$ ...................................................... E21B 17/02
[52] U.S. Cl. ................................. 166/381; 166/241.6
[58] Field of Search .............................. 166/381, 382, 166/384, 208, 241.1, 241.6

[56] References Cited

U.S. PATENT DOCUMENTS

| | | | |
|---|---|---|---|
| 2,699,920 | 1/1955 | Zublin | 255/1.6 |
| 2,797,893 | 7/1957 | McCune et al. | 255/1.6 |
| 2,839,270 | 6/1958 | McCune et al. | 255/1.6 |
| 3,741,302 | 6/1973 | Brown | 166/241.1 |
| 4,771,830 | 9/1988 | Peate | 166/241.6 |
| 5,113,938 | 5/1992 | Clayton | 166/117.6 |
| 5,131,467 | 7/1992 | Osborne et al. | 166/117.6 |
| 5,193,620 | 3/1993 | Braddick | 166/382 |
| 5,388,648 | 2/1995 | Jordan, Jr. | 166/50 X |

*Primary Examiner*—William P. Neuder
*Attorney, Agent, or Firm*—William M. Imwalle; Charles W. Gaines

[57] ABSTRACT

A decentralizer for a diverter, a centralizing guide bushing and a downhole-deployable locating and orienting subsystem. The subsystem is capable of three modes of operation: (a) a running mode in which an actuating mandrel is in a first axial limit position with respect to a common mandrel, the actuating mandrel placing first and second double-acting springs in a stowed position wherein locating and orienting keys are retracted radially inwardly with respect to the common mandrel to shield the locating and orienting keys from substantial contact with a surrounding well flow conductor as the common mandrel traverses therethrough, (b) a locating mode in which the actuating mandrel is in an intermediate axial position with respect to the common mandrel, the actuating mandrel placing the first and second double-acting springs in a deployed position resiliently to bias the locating and orienting keys radially outwardly with respect to the common mandrel to seek a locating and orienting profile on an inner surface of a surrounding honed bore within the surrounding well flow conductor, and (c) a set mode in which the actuating mandrel is in a second axial limit position with respect to the common mandrel, the actuating mandrel directly engaging and stiffly retaining the locating and orienting keys in engagement with the locating and orienting profile thereby to fix the common mandrel in a desired location and orientation with respect to the honed bore.

30 Claims, 5 Drawing Sheets

DECENTRALIZING CENTRALIZING LOCATING AND ORIENTING SUBSYSTEMS AND METHODS FOR SUBTERRANEAN MULTILATERAL WELL DRILLING AND COMPLETION

CROSS-REFERENCE TO RELATED APPLICATION

This is a continuation of Ser. No. 08/380,768 filed on Jan. 30, 1995 which is a continuation-in-part of Ser. No. 08/296, 941, filed on Aug. 26, 1994, entitled "Improved Methods and Systems for Subterranean Multilateral Well Drilling and Completion," commonly assigned with the present invention and incorporated herein by reference.

TECHNICAL FIELD OF THE INVENTION

The present invention is directed, in general, to well drilling and completion and more specifically to methods and systems for providing diverter decentralization, centralization at a lateral junction and locating and orienting for downhole structures.

BACKGROUND OF THE INVENTION

Horizontal well drilling and production have become increasingly important to the oil industry in recent years. While horizontal wells have been known for many years, only relatively recently have such wells been determined to be a cost-effective alternative to conventional vertical well drilling. Although drilling a horizontal well costs substantially more than its vertical counterpart, a horizontal well frequently improves production by a factor of five, ten or even twenty in naturally-fractured reservoirs. Generally, projected productivity from a horizontal wellbore must triple that of a vertical wellbore for horizontal drilling to be economical. This increased production minimizes the number of platforms, cutting investment and operational costs. Horizontal drilling makes reservoirs in urban areas, permafrost zones and deep offshore waters more accessible. Other applications for horizontal wellbores include periphery wells, thin reservoirs that would require too many vertical wellbores, and reservoirs with coning problems in which a horizontal wellbore could be optimally distanced from the fluid contact.

Also, some horizontal wellbores contain additional wellbores extending laterally from the primary vertical wellbores. These additional lateral wellbores are sometimes referred to as drainholes and vertical wellbores containing more than one lateral wellbore are referred to as multilateral wells. Multilateral wells are becoming increasingly important, both from the standpoint of new drilling operations and from the increasingly important standpoint of reworking existing wellbores, including remedial and stimulation work.

As a result of the foregoing increased dependence on and importance of horizontal wells, horizontal well completion, and particularly multilateral well completion, have been important concerns and continue to provide a host of difficult problems to overcome. Lateral completion, particularly at the juncture between the main and lateral wellbores, is extremely important to avoid collapse of the wellbore in unconsolidated or weakly consolidated formations. Thus, open hole completions are limited to competent rock formations; and, even then, open hole completions are inadequate since there is no control or ability to access (or reenter the lateral) or to isolate production zones within the wellbore. Coupled with this need to complete lateral wellbores is the growing desire to maintain the lateral wellbore size as close as possible to the size of the primary vertical wellbore for ease of drilling and completion.

The above concerns can be summarized in three main objectives: connectivity, isolation and access. Connectivity refers to the mechanical coupling of casings in the main and lateral wellbores such that there are no sections of open hole between the two casings. This ensures that the multilateral completion is not subject to collapse of a section of open hole.

Isolation refers to the ability to seal off one or more wellbores, or any selectable portion thereof, without impeding production from remaining wellbores or portions. To isolate one wellbore from another effectively, the casings in the wellbores must be hydraulically sealed (generally up to 5000 psi) to one another to allow the multilateral completion as a whole to withstand hydraulic pressure. Hydraulic sealing is particularly important at the juncture between main and lateral wellbores. Without hydraulic sealing, either pressure is lost into the void that surrounds the casing or fluid or particulate contaminates are allowed to enter the casing from the surrounding void. While connectivity, isolation and access are important in both horizontal and vertical wells, they are particularly important and pose particularly difficult problems in multilateral well completions. As mentioned above, isolating one lateral wellbore from other lateral wellbores is necessary to prevent migration of fluids and to comply with completion practices and regulations regarding the separate production of different production zones. Zonal (or partial wellbore) isolation may also be needed if the wellbore drifts in and out of the target reservoir because of insufficient geological knowledge or poor directional control. When horizontal wellbores are drilled in naturally-fractured reservoirs, zonal isolation is seen as desirable. Initial pressure in naturally-fractured formations may vary from one fracture to the next, as may the hydrocarbon gravity and likelihood of coning. Allowing the formations to produce together permits crossflow between fractures. A single fracture with early water breakthrough may jeopardize the entire well's production.

Access refers to the ability to reenter a selected one of the wellbores to perform completion work, additional drilling or remedial and stimulation work, preferably without requiring a full drilling rig. In the most preferable situation, any one of the lateral wellbores can be entered using coiled tubing, thereby saving money.

There have been several prior art techniques of completing multilateral wells using open-hole completion techniques. One involves the drilling of a single main wellbore and one or more lateral wellbores emanating from a base portion thereof. The main wellbore is cased except for the base portion. The base portion and the one or more lateral wellbores are left open-hole. Although this completion technique is relatively inexpensive, not one of the above three main objectives (connectivity, isolation and access) is satisfied, as there are portions of the wellbores left open-hole, the open-hole wellbores cannot be selectively sealed off, except to a limited degree with open-hole isolation tools and access to the lateral wellbores can only be by way of bent subs or orientation devices. Apart from the three main objectives, if one of the lateral wellbores collapses or becomes clogged, the entire well is threatened.

Another prior art completion technique calls for the drilling of one or more open hole lateral wellbores from a main wellbore. A special casing having a number of inflatable open-hole packers and perforations between the inflatable packers is placed in the main wellbore. The inflatable packers serve to separate the lateral wellbores hydraulically from one another. This technique therefore offers a degree of isolation, in that an entire lateral can be sealed off from the rest. However, portions of a lateral cannot be sealed off. Further, there is neither connectivity nor access. Finally, the lateral wellbores are left open-hole. Therefore, if a lateral wellbore collapses or becomes clogged, production from that wellbore is compromised.

Conventionally, some multilateral completion techniques have employed slotted liner completion. The primary purpose of inserting a slotted liner in a lateral wellbores is to guard against hole collapse. Additionally, a liner provides a convenient path to insert various tools such as coiled tubing in the wellbore. Three types of liners have been used, namely: (1) perforated liners, where holes are drilled in the liner, (2) slotted liners, where slots of various width and length are milled along the line length, and (3) prepacked screens.

One prior art completion technique employing liners is similar to the first-described open-hole completion technique, but requires the lateral wellbores to be fitted with liners. However, the liners terminate within the lateral wellbores, resulting in short lateral wellbore sections proximate the main wellbore that are left open-hole. Similarly, the base portion of the main wellbore is left open-hole. Although not as inexpensive as the first-described open-hole technique, this completion technique is still relatively inexpensive. However, none of the above three main objectives is satisfied, as portions of each lateral wellbore and the base portion of the main wellbore are left open-hole. The openhole wellbores cannot be selectively sealed off, except to a limited degree with open-hole isolation tools. Finally, access to the lateral wellbores can only be by way of bent subs or orientation devices. The sole advantage of this completion technique is that liners provide support as against erosion or collapse in the lateral wellbores.

A second completion technique employing lined laterals involves two lateral wellbores extending from a main wellbore, one over the other, each having a liner and each liner extending back to a casing in the main wellbore. Thus, connectivity is achieved, as the liners are hydraulically sealed to the main wellbore casing. Unfortunately, the lower of the two lateral wellbores cannot be sealed off (isolated). Further, the lower of the two lateral wellbores cannot be accessed subsequently. Thus, only one of the three principal objectives is met.

A third completion technique employing lined laterals is reserved for new well completion and involves the drilling of multiple lateral wellbores from a main wellbore. A liner is inserted into the main wellbore. The liner is provided with windows therein corresponding to the position of the laterals. Thus, the main wellbore liner must be oriented when it is inserted. Next, liners are inserted into the lateral wellbores. The open ends of the lateral wellbore liners extend through the windows of the main wellbore liner. This technique is designed for new wells, because the location and orientation of the lateral wellbores must be prearranged. Applying the three main objectives, connectivity is not present, since the lateral wellbore liners are not sealed to the main wellbore liner. Isolation is possible, but access to the lateral wellbores for the purpose of reworking or isolating a lateral wellbore must be made by way of bent subs or orientation devices.

One further prior art completion technique does not involve either open-hole or lined lateral wellbores. This technique requires the drilling of a relatively large main wellbore. Multiple lateral wellbores are drilled in parallel through the bottom of the main wellbore and spread in separate directions. The main and lateral wellbores are cased and sealed together. All three of the three main objectives are met, as isolation of and access to each lateral wellbore are provided. However, in most cases, only two or three lateral wellbores are allowed, as the cross-sectional areas of the lateral wellbores must fit within the cross-sectional area of the main wellbore. This severely limits the cost effectiveness of the well as a whole, as the main wellbore must be of exceptionally large diameter and thus relatively expensive to drill.

The problem of lateral wellbore (and particularly multilateral wellbore) completion has been recognized for many years as reflected in the patent literature, For example, U.S. Pat. No. 4,807,704 discloses a system for completing multiple lateral wellbores using a dual packer and a deflective guide member. U.S. Pat. No. 2,797,893 discloses a method for completing lateral wells using a flexible liner and deflecting tool. U.S. Pat. No. 2,397,070 similarly describes lateral wellbore completion using flexible casing together with a closure shield for closing off the lateral. In U.S. Pat. No. 2,858,107, a removable whipstock assembly provides a means for locating (e.g., accessing) a lateral subsequent to completion thereof. U.S. Pat. No. 3,330,349 discloses a mandrel for guiding and completing multiple horizontal wells. U.S. Pat. Nos. 4,396,075; 4,415,205; 4,444,276 and 4,573,541 all relate generally to methods and devices for multilateral completions using a template or tube guide head. Other patents of general interest in the field of horizontal well completion include U.S. Pat. Nos. 2,452,920 and 4,402,551.

Notwithstanding the above-described attempts at obtaining cost-effective and workable lateral well completion, there continues to be a need for new and improved methods and devices for providing such completions, particularly sealing between the juncture of vertical and lateral wells, the ability to access lateral wells (particularly in multilateral systems) and achieving zone isolation between respective lateral wells in a multilateral well system.

There is also a need for gaining economy in lateral well completions. Toward this end, it is highly advantageous to minimize the number of trips necessary to drill and complete a lateral wellbore.

Ser. No. 08/296,941, initially referenced above, discloses several methods and systems for subterranean multilateral well drilling and completion. There are several problems, however, that occur in the environment of multilateral well drilling and completion that have, to date, not been addressed or solved.

The first regards placement of the diverter or drilling whipstock within the main well flow conductor. Such diverters or whipstocks are characterized by a sharp toppoint. It is important that the toppoint rest against the sidewall of the well flow conductor. Otherwise, if the toppoint protrudes a significant distance into the well flow conductor, a milling or drilling bit employed to form the lateral bore may come into contact with the toppoint, thereby causing it and the underlying diverter or whipstock harm. While some prior art systems were directed to providing decentralization for the diverter or whipstock, such systems were not amenable to hollow whipstocks, wherein a large central bore must remain clear of obstacles.

The second regards entry of tools into the lateral borehole via the window in the main well flow conductor. Often, reduced-diameter tools are employed to reenter lateral boreholes, such as those typically deployed from coiled-tube rigs for rework purposes. The reduced-diameter tools tend to wander radially within the main well flow conductor as they are lowered therethrough and pose a risk of becoming jammed in or about the window or inadvertently engaging with the periphery of the window, possible damaging the window. The prior art does not address radial centralization of reduced-diameter tools for guided entry into lateral wellbores.

Finally, it is important that subsystems employed to locate and orient devices, such as bushings or diverters, not be harmed in their trip to the appropriate deployment point. Such subsystems commonly use spring-loaded keys that bear against the sidewall of the main well flow conductor during their trip down. As with other tools, these keys may come into contact with the window in the well flow conductor, inadvertently engaging therewith and potentially harming the window or the keys. The prior art does not provide a way of downhole-deploying such keys; nor does the prior art provide a subsystem having separate locating and set modes.

SUMMARY OF THE INVENTION

To address the above-discussed deficiencies of the prior art, it is a primary object of the present invention to provide decentralization for a diverter within a main well flow conductor, a bushing for providing axial and radial centralization within the main well flow conductor and a subsystem for locating and orienting objects within the main well flow conductor.

In the attainment of the primary object, the present invention, in one aspect thereof, provides a decentralizer for a diverter, comprising: (1) first and second substantially coaxial tubular members slidably coupled to one another to allow relative axial movement therebetween and coupled to the diverter, the first tubular member having a shoulder projecting radially outwardly from an outer surface thereof, the second tubular member having a conical ramp projecting radially outwardly from an outer surface thereof and (2) a decentralizing ring slidably mounted on the outer surface of the first tubular member and between the shoulder and the conical ramp. The first and second tubular members are axially movable to move the shoulder and the conical ramp together. The shoulder urges the decentralizing ring onto the conical ramp, which causes the decentralizing ring to (a) expand eccentrically from the first and second tubular members, (b) engage a well flow conductor surrounding the first and second tubular members and (c) decentralize the first and second tubular members within the well flow conductor. The diverter is thereby decentralized within the well flow conductor.

Thus, the present invention provides the conical ramp to serve as a foundation upon which the decentralizing ring is forcibly placed. Either or both the conical ramp and decentralizing ring may be eccentric to effect the decentralization. Assuming, as in the embodiment to be illustrated, that the conical ramp is eccentric, the decentralizing ring becomes eccentric to the axis of the first and second tubular members as it is urged onto the ramp. As the decentralizing ring engages the inner wall of the main well flow conductor, the first and second members are decentralized with respect thereto. Furthermore, the present invention is fully employable as a decentralizer for a hollow diverter or whipstock, since, as will be illustrated, the decentralizer can have a hollow core.

In a preferred embodiment of this aspect of the present invention, an axis of rotation of the conical ramp is parallel to, and radially offset from, an axis of the second tubular member. Again, this is directed toward an embodiment that employs an eccentric ramp, rather than an eccentric decentralizing ring. Those of skill in the art will recognize, however, that the axis of the conical ramp can be aparallel with respect to the axis of the second tubular member.

In a preferred embodiment of this aspect of the present invention, the first and second tubular members are further coupled to a centralizer axially distal from the decentralizer, the cenralizer and the decentralizer cooperable to misalign an axis of the first and second tubular members with respect to the well flow conductor.

The present invention, in this embodiment, provides a centralized point in the form of a distal centralizer and a decentralized point in the form of the decentralizer. The two cooperate to misalign the axis of the first and second tubular members.

In a preferred embodiment of this aspect of the present invention, the decentralizing ring is a split ring having a substantially conical inner surface and a substantially cylindrical outer surface.

As those of skill in the art are familiar, a split ring contains a separable split at a location about a periphery thereof. As the split decentralizing ring is urged onto the ramp, it must expand in diameter to traverse the ramp. The separable split accommodates this expansion.

In a preferred embodiment of this aspect of the present invention, the decentralizer further comprises a second decentralizing ring axially offset from the decentralizing ring. The two rings cooperate to centralize the first and second tubular members with respect to the well flow conductor.

In a preferred embodiment of this aspect of the present invention, the decentralizer is coupled to a packer. As mentioned above, the first and second tubular members are further coupled to a centralizer axially distal from the decentralizer. This distal centralizer may be embodied in the packer. If the packer is to function as the centralizer, the packer and the decentralizer are then cooperable to misalign an axis of the first and second tubular members with respect to the well flow conductor. Otherwise, the packer simply provides at least a predetermined location for the decentralizer within the well flow conductor.

In a preferred embodiment of this aspect of the present invention, the decentralizer further comprises a shear pin shearably coupling the first and second tubular members as against axial movement. The shear pin must be sheared before the shoulder may be moved toward the ramp; therefore, the shear pin is a safety device as against premature, inadvertent deployment of the decentralizer.

In a preferred embodiment of this aspect of the present invention, activation of a packer associated with the decentralizer causes the shoulder to move toward the conical ramp. Copending Ser. No. 08/380,901, filed on even date hereto now U.S. Pat. No. 5,501,281 and entitled Torque-Resistant, Seal Setting Force-Limited, Hydraulically Settable Well Packer Structure and Associated Methods," commonly assigned herewith and incorporated herein by reference discloses a packer having a packer body assembly and a tubular structure adapted to move relative to one another. The present invention is adapted to interface to this packer, the first and second tubular members corresponding to the packer body assembly and the tubular structure thereof.

In a preferred embodiment of this aspect of the present invention, the diverter is a whipstock, the whipstock decentralized within the well flow conductor to protect a toppoint of the diverter from destructive contact with a drilling tool. Thus, in this preferred embodiment, the decentralizer is a whipstock protection device. When the whipstock is set in place within a main well flow conductor in preparation to drill a lateral borehole, it is possible that the toppoint of the whipstock is not against the sidewall of the main well flow conductor. When a milling or drilling bit is lowered subsequently to form the lateral bore, it is possible that the bit may contact and damage the toppoint, compromising the function of the whipstock as a whole. Therefore, it is important that the toppoint be against the sidewall of the main well flow conductor. The decentralizer of the present invention can perform this function.

In a preferred embodiment of this aspect of the present invention, a packer associated with the decentralizer is capable of retaining the decentralizing ring in engagement with the well flow conductor. The packer described above is provided with a means for retaining the packer in a set position. This means may be employed to retain the decentralizer in its set position, too.

The present invention, in another aspect thereof, provides a guide bushing for use proximate a junction between a main well flow conductor and a lateral wellbore, the guide bushing comprising: (1) a tubular member having a predetermined inner diameter less than that of the main well flow conductor and an outer diameter sufficient substantially to centralize the guide bushing within the main well flow conductor, the tubular member having a bushing window defined in a sidewall thereof, the bushing window having a defined height thereof, the guide bushing locatable proximate the junction, the bushing window registerable with a main well flow conductor window, the guide bushing centralizing a tool having a diameter less than the predetermined inner diameter with respect to the main well flow conductor, the bushing window protecting a periphery of the main well flow conductor window from contact with the tool and (2) an anchoring structure coupled to the tubular member for fixing the tubular member at a predetermined location and orientation within the main well flow conductor.

As discussed previously, reduced-diameter tools, such as those deployed by coiled tubing, are liable to wander radially when lowered into the main well flow conductor. Thus, the present invention introduces a centralizing mandrel that not only centralizes such reduced-diameter tools within and with respect to the main well flow conductor, but also axially with respect to the window, thereby providing a reliable guide for such tools into the lateral borehole. Simultaneously, radial orientation of the tools is also achieved.

The window in the main well flow conductor that leads to the lateral borehole may be rough or malformed. Further, the window may be subject to disturbance or destruction by way of contact with tools passing through the window. A beneficial by-product of the guide bushing of the present invention is that the periphery of the window is protected from deleterious contact with the reduced-diameter tools.

In a preferred embodiment of this aspect of the present invention, the tubular member is flanged at upper and lower portions thereof substantially to centralize the tubular member within the main well flow conductor. Those of skill in the art will recognize that structures other than flanges can be used to accomplish the same objective of centralizing the guide bushing.

In a preferred embodiment of this aspect of the present invention, edges of the bushing window are tapered to protect the periphery of the main well flow conductor window from contact with the tool. The taper provides a smooth edge to the bushing window for passage of tools and further protects the main well flow conductor window.

In a preferred embodiment of this aspect of the present invention, a lower edge of the bushing window is separated a predetermined axial distance from a lower edge of the periphery of the main well flow conductor window to protect the lower edge of the periphery of the main well flow conductor window from contact with the tool. This separation protects the lower part of the main well flow conductor window (which is a relatively sharp edge) from deleterious contact with the tool.

In a preferred embodiment of this aspect of the present invention, the tool is suspended by coiled tubing. Those of skill in the art will recognize that there are other accepted ways for lowering tools into the main well flow conductor.

The present invention, in yet another aspect thereof, provides a downhole-deployable locating subsystem. The subsystem comprises a common mandrel having locating and orienting keys coupled thereto by first and second double-acting springs, respectively, and an actuating mandrel axially displaceable with respect thereto, the common mandrel, actuating mandrel and first and second double-acting springs cooperable to yield three modes of operation: (a) a running mode in which the actuating mandrel is in a first axial limit position with respect to the common mandrel, the actuating mandrel placing the first and second double-acting springs in a stowed position wherein the locating and orienting keys are retracted radially inwardly with respect to the common mandrel to shield the locating and orienting keys from substantial contact with a surrounding well flow conductor as the common mandrel traverses therethrough, (b) a locating mode in which the actuating mandrel is in an intermediate axial position with respect to the common mandrel, the actuating mandrel placing the first and second double-acting springs in a deployed position resiliently to bias the locating and orienting keys radially outwardly with respect to the common mandrel to seek a locating and orienting profile in a honed bore on an inner surface of the surrounding well flow conductor, wherein the honed bore incorporates a landing nipple therein, and (c) a set mode in which the actuating mandrel is in a second axial limit position with respect to the common mandrel, the actuating mandrel directly engaging and stiffly retaining the locating and orienting keys in engagement with the locating and orienting profile thereby to fix the common mandrel in a desired location and orientation with respect to the window in the casing.

Thus, this third aspect provides a locating/orienting key subsystem that is downhole deployable. As mentioned previously, it is disadvantageous to risk substantial contact between the locating or orienting keys and the sidewall of the main well flow conductor for the full trip to the locating and orienting profile. Thus, the present invention allows the keys to remain retracted into the mandrel until they are in the honed bore and therefore proximate the locating and orienting profile, where they are automatically deployed.

In a preferred embodiment of this aspect of the present invention, the subsystem further comprises a dog structure coupled to the common mandrel and extending radially outwardly therefrom a distance sufficient to engage the surrounding honed bore, the honed bore capable of engaging the dog structure and causing the dog structure to be moved radially inwardly with respect to the common mandrel, the dog structure displacing the actuating mandrel from the first axial limit position into the intermediate axial position. Thus, in this preferred embodiment, the dog structure automatically senses the honed bore and causes the keys to deploy.

In a preferred embodiment of this aspect of the present invention, the subsystem further comprises an upper sleeve for urging the intermediate mandrel from the intermediate axial position into the second axial limit position only when the locating and orienting keys properly engage the locating and orienting profile. Thus, the present invention preferably prevents the subsystem from setting until both the locating and orienting keys are properly engaged.

In a preferred embodiment of this aspect of the present invention, the subsystem further comprises a dog structure extending radially from the common mandrel, the honed bore urging the dog structure into a first radially retracted position as the common mandrel traverses the honed bore in a first direction, the honed bore urging the dog structure into a second radially retracted position as the common mandrel traverses the honed bore in a second direction. Thus, the dog structure preferably discriminates between initial downward travel through the honed bore and subsequent upward travel therethrough.

In a preferred embodiment of this aspect of the present invention, the subsystem further comprises a retention spring for retaining an associated dog structure in a second radially retracted position. The dog retracts into the second radially retracted position against the urging of the retention spring. The retention spring then bears against a shoulder on the dog structure to retain it in the second radially retracted position.

In a preferred embodiment of this aspect of the present invention, the actuating mandrel comprises a ramped portion, the ramped portion moving to a position radially inward of the first and second double-acting springs when the actuating mandrel moves into the intermediate axial position to urge the double-acting spring into the deployed position.

In a preferred embodiment of this aspect of the present invention, the subsystem further comprises a lock for securing the actuating mandrel in the second axial limit position. Therefore, once the locating and orienting keys are properly engaged, the present invention preferably provides the lock to retain the actuating mandrel in the second axial limit position and thus retain the subsystem in the set mode.

In a preferred embodiment of this aspect of the present invention, a shearable member shearably maintains an upper sleeve in a predetermined position with respect to the common mandrel, the upper sleeve capable of shearing the shearable member to allow the subsystem to transition from the locating mode into the set mode. The shearable member (illustrated to be in the form of a shear pin) also prevents inadvertent transitioning of the subsystem from the running mode into the locating mode.

In a preferred embodiment of this aspect of the present invention, the subsystem further comprises a shearable member capable of maintaining the subsystem in the set mode, the shearable member shearable to allow the subsystem to transition from the set mode into the running mode to retrieve the common mandrel. The shearable member (illustrated to be in the form of a shear ring) can be sheared with substantial upward force to release the subsystem for retrieval from the main wellbore.

In a preferred embodiment of this aspect of the present invention, the subsystem further comprises a plurality of locating keys and associated double-acting springs, the locating and orienting keys spaced regularly about a circumference of the common mandrel and cooperating to locate and orient the mandrel within the surrounding honed bore.

Thus, there is more than one locating key in this preferred embodiment. The plurality of locating keys yields a stronger and more distributed support for the common mandrel.

In a preferred embodiment of this aspect of the present invention, pulling upward on the common mandrel causes the subsystem to transition from the set mode into the running mode.

In a preferred embodiment of this aspect of the present invention, a helical guide on the inner surface above the honed bore merges with the locating and orienting profile, the helical guide traversing more than a complete periphery above the honed bore.

By "more than a complete periphery," "more than 360°" is meant. This ensures that, no matter the orientation of the orienting lug, it must engage the helical guide at some point along its length.

In a preferred embodiment of this aspect of the present invention, a helical guide on the inner surface of the honed bore merges with the locating and orienting profile, the helical guide having a sidewall thereof at a non-normal angle with respect to an axis of the honed bore to prevent a boring tool from inadvertently engaging the helical guide.

In the embodiment to be illustrated, a sidewall of the helical guide is sloped. This prevents the boring tool from engaging and harming the helical guide.

In a preferred embodiment of this aspect of the present invention, the first and second double-acting springs each contain a stepped portion, a ramped portion of the actuating mandrel traversing the stepped portion as the actuating mandrel moves from the intermediate axial position into the second axial limit position. The stepped portion is employed to extend the associated locating and orienting keys.

In a preferred embodiment of this aspect of the present invention, after the locating and orienting keys traverse the honed bore past the locating and orienting profile, the subsystem is transitioned into the locating mode and the locating and orienting keys traverse back to the locating and orienting profile to engage the locating and orienting keys therewith.

The present invention further contemplates methods of (1) decentralizing a diverter, (2) providing centralization proximate a junction between a main well flow conductor and a lateral wellbore and (3) deploying a locating subsystem within a well flow conductor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
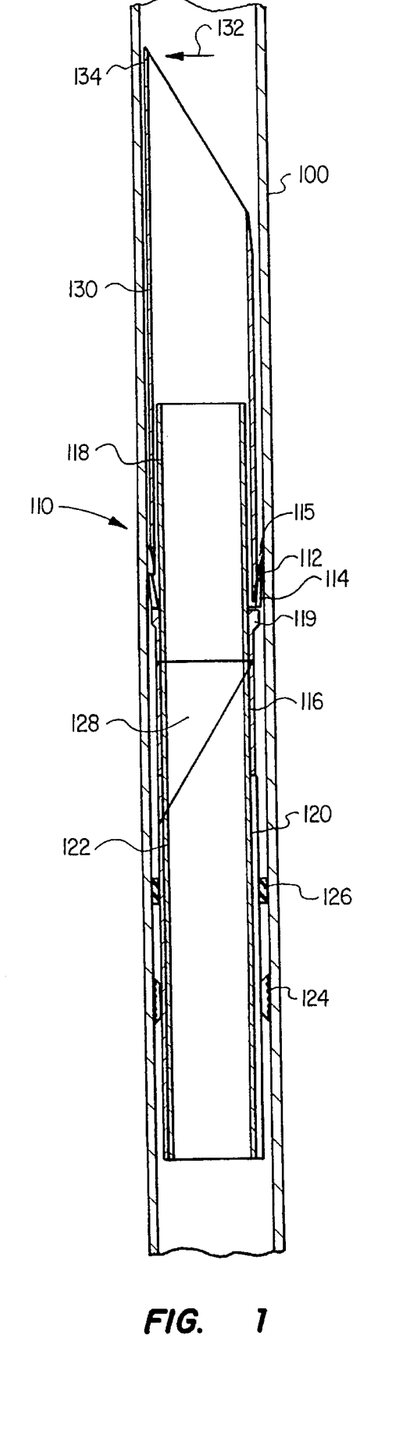
FIG. 1 illustrates a highly schematic, cross-sectional view through a vertical portion of a subterranean well flow conductor in which a decentralizer embodying principles of the present invention is operatively disposed.

Referring initially to FIG. 1, illustrated is a highly schematic, cross-sectional view through a vertical portion of a subterranean well flow conductor 100 in which a decentralizer, generally designated 110, embodying principles of the present invention is operatively disposed.

Figure 1A:
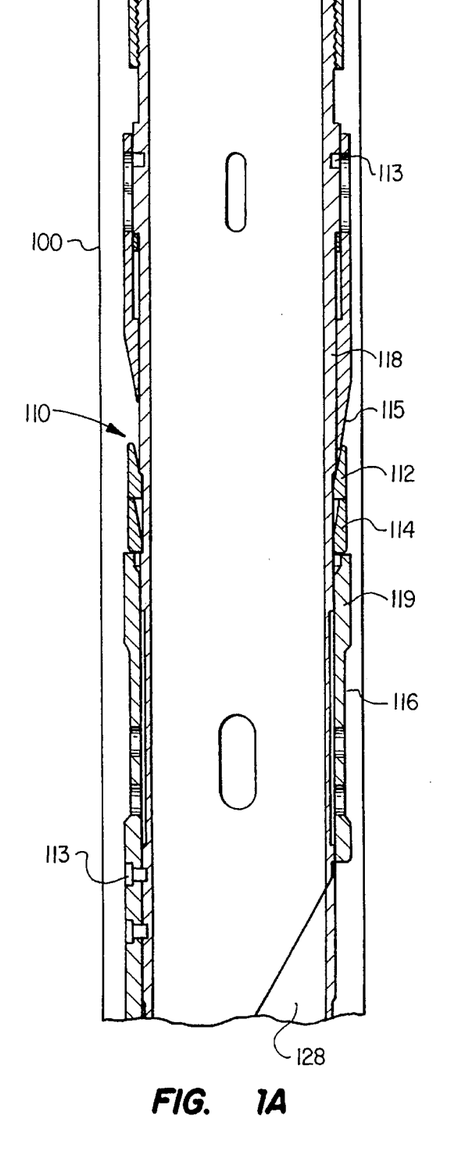
FIG. 1A illustrates an enlarged cross-sectional view of a portion of the subterranean well flow conductor and decentralizer of FIG. 1, wherein the decentralizer is in an initial running configuration.
Figure 1B:
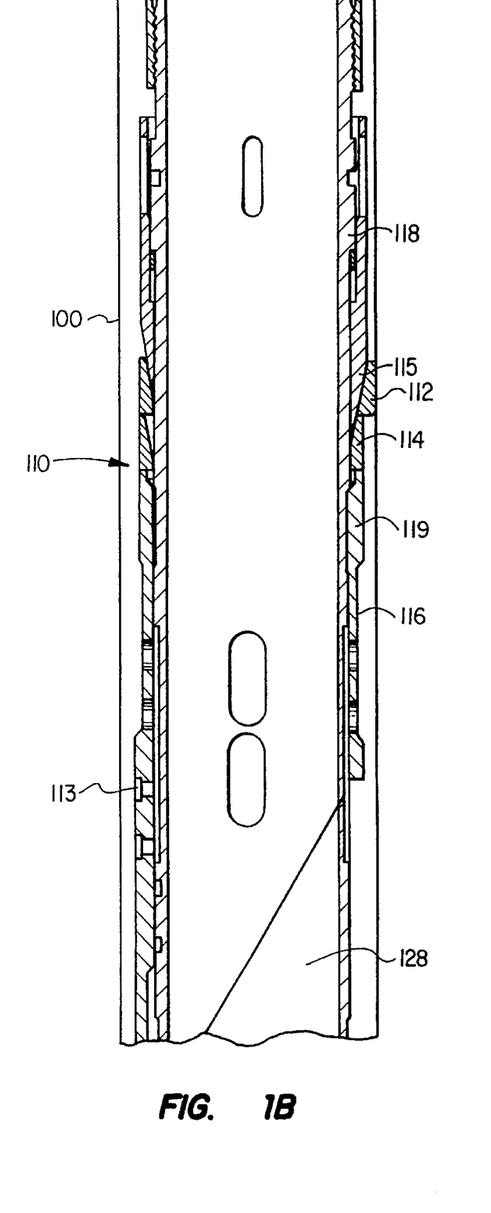
FIG. 1B illustrates an enlarged cross-sectional view of a portion of the subterranean well flow conductor and decentralizer of FIG. 1 wherein the decentralizer is in a subsequent deployed configuration.

In the overall process of drilling and completing a lateral well, the first step is to place a diverter (or whipstock) at a location and orientation representing where the lateral well is to branch from the main well. Accordingly, FIGS. 1, 1A and 1B illustrate structures put in place early on in the process.

Illustrated is a packer 120, which may be the packer described in Ser. No. (08/380,901). The packer 120 comprises a main body structure 122, one or more locating or orienting keys 124 and hydraulic seals 126. A muleshoe coupler 128 allows the decentralizer 110 to be releasably coupled to the packer 120.

A diverter 130 is coupled to the packer 120 via the decentralizer 110. The diverter 130 is, in the illustrated embodiment, a whipstock having a hardened slanted face capable of diverting boring tools, such as milling and drilling bits and a drillable core, allowing the whipstock to remain in place following the formation of a lateral borehole in a manner previously described.

The decentralizer 110 comprises first and second decentralizing rings 112, 114 that cooperate with an eccentric ramp 115 (not detailed in FIG. 1, but fully detailed in FIGS. 1A and 1B) to decentralize the diverter 130 with respect to a centerline of the well flow conductor 100. In the illustrated embodiment, the exterior surface of the ramp 115 is eccentric. However, it is fully contemplated that the interior surface of the decentralizing rings 112, 114 may be eccentric. Decentralization causes the diverter 130 to move in the direction shown by an arrow 132, thereby protecting a toppoint 134 of the diverter 130 from possible harm caused by contact with a boring tool.

The decentralizer 110 further comprises first and second tubular members 116, 118. The first tubular member 116 has a shoulder 119 associated therewith that projects radially outwardly from the first tubular member 116. The shoulder 119 is adapted to engage the decentralizing rings 112, 114 to urge the rings 112, 114 onto the eccentric ramp 115. As is apparent from FIG. 1, both the first and second tubular members 116, 118 extend downwardly to the packer 120. In the illustrated embodiment, the diverter 130 moves downwardly under the mass of the drillstring, moving the first and second tubular members 116, 118 axially with respect to one another against the packer 120. This urges the decentralizing rings 112, 114 onto the eccentric ramp 115, thereby setting the decentralizer 110. The packer 120 further retains the decentralizer 110 in the set position.

Turning now to FIG. 1A, illustrated is an enlarged cross-sectional view of a portion of the subterranean well flow conductor 100 and decentralizer 110 of FIG. 1 wherein the decentralizer 110 is in an initial running configuration.

Again, FIG. 1A shows first and second decentralizing rings 112, 114, an eccentric ramp 115, first and second tubular members 116, 118 and a shoulder 119 associated with the first tubular member 116.

In the illustrated embodiment, an axis of rotation of the conical ramp 115 is parallel to, and radially offset from, an axis of the second tubular member 118. In practice, this is accomplished by first turning the second tubular member 118 in a lathe and then offsetting the second tubular member 118 in the lathe, maintaining the second tubular member's orientation. Those of skill in the art will doubtless recognize, however, that the axis of the conical ramp 115 can be aparallel with respect to the axis of the second tubular member 118.

In the illustrated embodiment, the first and second decentralizing rings 112, 114 are split rings having substantially conical inner surfaces and substantially cylindrical outer surfaces. The substantially conical inner surfaces allow the decentralizing rings 112, 114 to traverse the conical ramp 115 without undue stress. The substantially cylindrical outer surfaces allow the decentralizing rings 112, 114 to engage the well flow conductor 100 as designed.

As those of skill in the art are familiar, a split ring contains a separable split at a location about a periphery thereof. As the decentralizing rings 112, 114 are urged onto the eccentric ramp 115, they must expand in diameter to traverse the eccentric ramp 115. The separable split accommodates this expansion.

In the illustrated embodiment, the decentralizer 110 further comprises a shear pin 113 shearably coupling the first and second tubular members 116, 118 as against axial movement. The shear pin 113 must be sheared before the shoulder 119 may be moved toward the eccentric ramp 115. Therefore, the shear pin 113 is a safety device as against premature, inadvertent deployment of the decentralizer 110.

Turning now to FIG. 1B, illustrated is an enlarged cross-sectional view of a portion of the subterranean well flow conductor 100 and decentralizer 110 of FIG. 1 wherein the decentralizer 110 is in a subsequent deployed configuration. Thus, the first tubular member 116, under the influence of the underlying packer (120 of FIG. 1) has moved relative to the second tubular member 118, shearing the shear pin 113. The shoulder 119 has engaged the first and second decentralizing rings 112, 114, urging them onto the eccentric ramp 115 and into engagement with the well flow conductor 110. Because the ramp 115 is illustrated as eccentric, the first and second tubular members 116, 118 are thereby decentralized with respect to a central axis, or centerline, of the well flow conductor 100. This, again, decentralizes the diverter (130 of FIG. 1). An interference ring 111 prevents overextension of the ramp 115 with respect to the shoulder 119 by transmitting only a limited amount of force from the second tubular member 118 to the ramp 115 before sliding. In this manner, the interference ring 111 acts as a force limiting device and prevents the diverter 130 from being decentralized with too great a force.

From the above, it is apparent that one aspect of the present invention provides a decentralizer for a diverter, comprising: (1) first and second substantially coaxial tubular members slidably coupled to one another to allow relative axial movement therebetween and coupled to the diverter, the first tubular member having a shoulder projecting radially outwardly from an outer surface thereof, the second tubular member having an eccentric conical ramp projecting radially outwardly from an outer surface thereof and (2) a decentralizing ring slidably mounted on the outer surface of the first tubular member and between the shoulder and the conical ramp. The first and second tubular members are axially movable to move the shoulder toward the conical ramp. The shoulder urges the decentralizing ring onto the conical ramp, which causes the decentralizing ring to (a) expand eccentrically from the first and second tubular members, (b) engage a well flow conductor surrounding the first and second tubular members and (c) decentralize the first and second tubular members within the well flow conductor.

Figure 2:
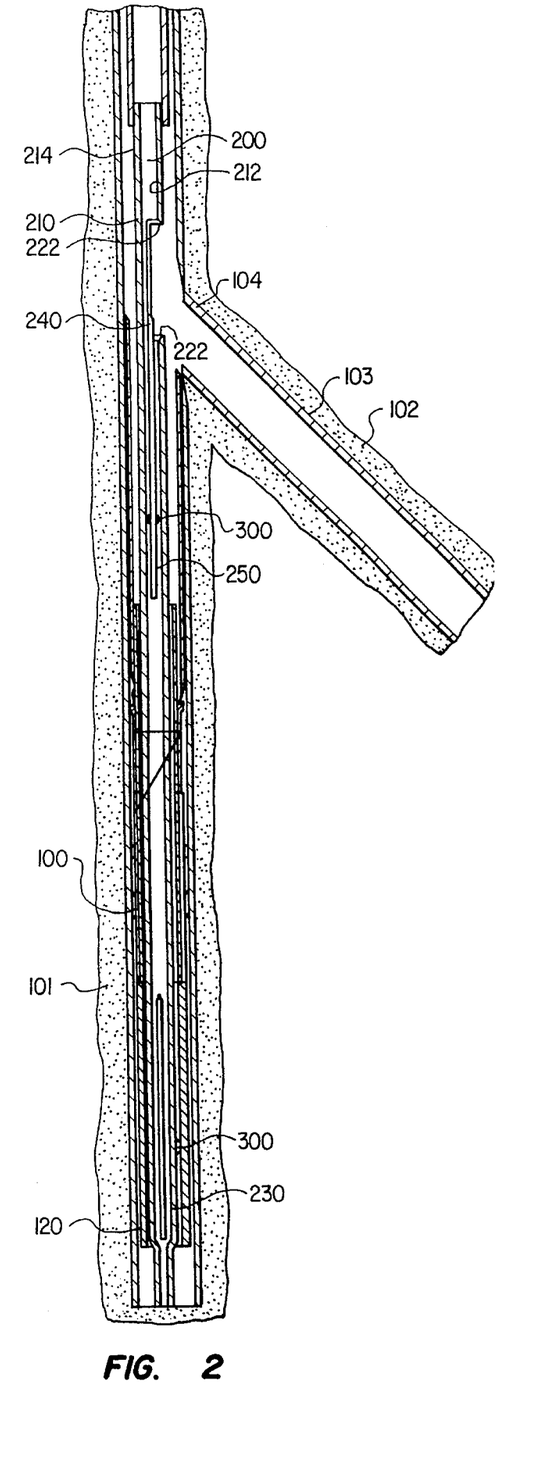
FIG. 2 illustrates a highly schematic, cross-sectional view through a vertical portion of a subterranean well flow conductor in which the decentralizer of FIG. 1, a guide bushing and a locating and orienting subsystem embodying principles of the present invention are operatively disposed.

Turning now to FIG. 2, illustrated is a highly schematic, cross-sectional view through a vertical portion of a subterranean well flow conductor 100 in which the decentralizer 110 of FIG. 1, a guide bushing 200 and a locating and orienting subsystem 300 embodying principles of the present invention are operatively disposed.

In the overall process of drilling and completing a lateral well, once the lateral wellbore is formed, a liner is placed into the lateral wellbore and cemented therein. Depending upon whether the liner extends into the main well flow conductor to block the same, a portion of the liner must be removed. Once the liner portion has been removed, the lower portion of the main well flow conductor is reestablished and the process continues. At this point, the present invention, as illustrated, calls for the placement of a guide bushing at the junction of the main and lateral wells primarily to centralize reduced-diameter tools radially within the main well flow conductor proximate the junction and, secondarily, to protect the window to the lateral from damage by contact with the tools. Accordingly, FIG. 2 illustrates the guide bushing structure and an anchoring structure therefor, the anchoring structure preferably comprising the locating and orienting subsystem of the present invention.

FIG. 2 shows the main well flow conductor 100 within a main wellbore 101. A lateral wellbore 102 extends from the main wellbore 101 and contains a liner 103 cemented into place. A main well flow conductor window 104 exists at the junction of the main and lateral wellbores 101, 102. It is the integrity of the main well flow conductor window 104 and the reliability of diversion of tools into the liner 103 that the guide bushing 200 of the present invention is directed.

Accordingly, the guide bushing 200 comprises a tubular member 210 having a predetermined inner diameter 212 less than that of the main well flow conductor 100 and an outer diameter 214 sufficient substantially to centralize the guide bushing 200 within the main well flow conductor 100. The tubular member 210 has a bushing window 220 defined in a sidewall thereof. The bushing window 220 has a defined height and is located proximate the junction of the main and lateral wellbores 101, 102 (i.e., across from the main well flow conductor window 104). The bushing window 220 is therefore registered with the main well flow conductor window 104. Since the inner diameter 212 of the guide bushing is less than that of the main well flow conductor 100, the guide bushing 200 centralizes tools having a diameter less than the predetermined inner diameter 212 with respect to the main well flow conductor 100. Further, the bushing window 220 protects a periphery of the main well flow conductor window 104 from contact with the tool by virtue of the bushing window 200.

In the illustrated embodiment, the tubular member 210 is flanged at upper and lower portions thereof substantially to centralize the tubular member 210 within the main well flow conductor 100. Those of skill in the art will recognize that structures other than flanges can be used to accomplish the same objective of centralizing the guide bushing 200.

In the illustrated embodiment, edges 222 of the bushing window 220 are tapered to protect the periphery of the main well flow conductor window 104 from contact with the tool. The taper provides a smooth edge to the bushing window 220 for passage of tools and further protects the main well flow conductor window 104.

In the illustrated embodiment, a lower edge of the bushing window 220 is separated a predetermined axial distance from a lower edge of the periphery of the main well flow conductor window 104 to protect the lower edge of the periphery of the main well flow conductor window 104 from contact with the tool. This separation protects the lower part of the main well flow conductor window 104 (which is a relatively sharp edge) from deleterious contact with the tool.

The guide bushing 200 is held at a desired location and orientation within the packer 120 within by an anchoring structure 230 comprising the subsystem 300 of the present invention. The hollow packer 120 and the hollow whipstock 130 cooperate to form an orienting landing nipple or honed bore in which the anchoring structure 230 is located and oriented. A portion of the orienting landing nipple is honed to a fine finish, thence the reference to the landing nipple as a honed bore. The honed bore fits within, and therefore has a smaller inner diameter than the main well flow conductor 100.

In a manner to be described more particularly with reference to FIGS. 2A, 2B, 2C, 3 and 3A, the subsystem 300 serves releasably to place the guide bushing 200 at its predetermined location and orientation within the honed bore. FIG. 2 further shows a deflector 240 in place. The deflector 240 acts as a diverter in the sense that it deflects objects within and with respect to the wellbore. Unlike the diverter 130 of FIG. 1, however, the deflector 240 is preferably not a hardened whipstock, but instead is designed to deflect inserted tools and the like into the lateral wellbore 102. As with the guide bushing 200, the deflector 240 is held in place by an anchoring structure 250, preferably including the locating and orienting subsystem 300 of the present invention that fits within a honed bore defined within the anchoring structure 230. If it is desired to enter the portion of the main well flow conductor 100 below the deflector 240 or allow flow through the conductor 100, the deflector 240 should be removed.

From the above, it is apparent that another aspect of the present invention provides a guide bushing for use proximate a junction between a main well flow conductor and a lateral wellbore, the guide bushing comprising: (1) a tubular member having a predetermined inner diameter less than that of the main well flow conductor and an outer diameter sufficient substantially to centralize the guide bushing within the main well flow conductor, the tubular member having a bushing window defined in a sidewall thereof, the bushing window having a defined height thereof, the bushing locatable proximate the junction, the bushing window registerable with a main well flow conductor window, the bushing centralizing a tool having a diameter less than the predetermined inner diameter with respect to the main well flow conductor, the bushing window protecting a periphery of the main well flow conductor window from contact with the tool and (2) an anchoring structure coupled to the tubular member for fixing the tubular member at a predetermined location and orientation within the main well flow conductor.

Figure 2A:
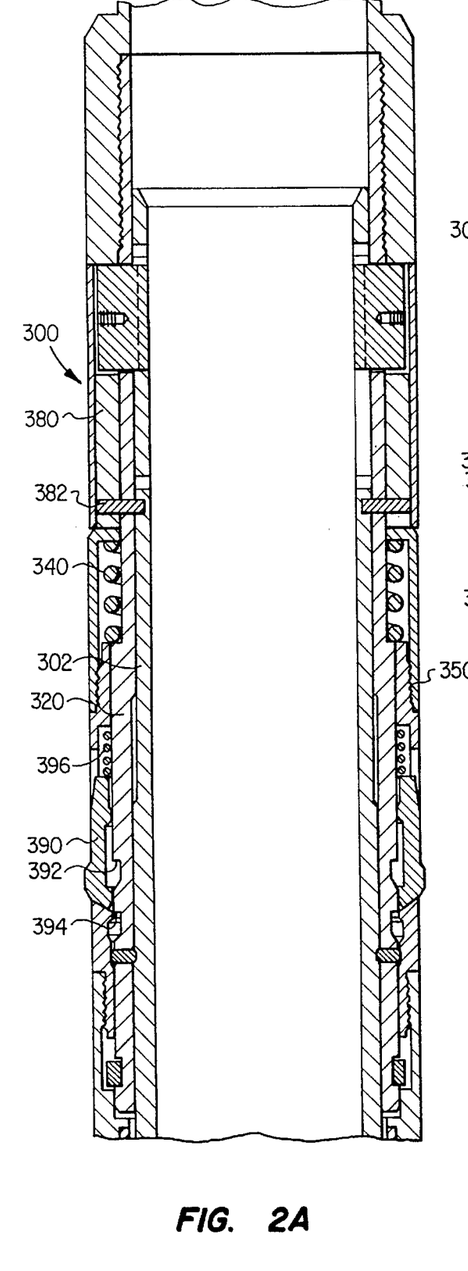
FIG. 2A illustrates an enlarged cross-sectional view of an upper portion of the subterranean well flow conductor and locating and orienting subsystem of FIG. 2 wherein the locating and orienting subsystem is in an initial running configuration.
Figure 2B:
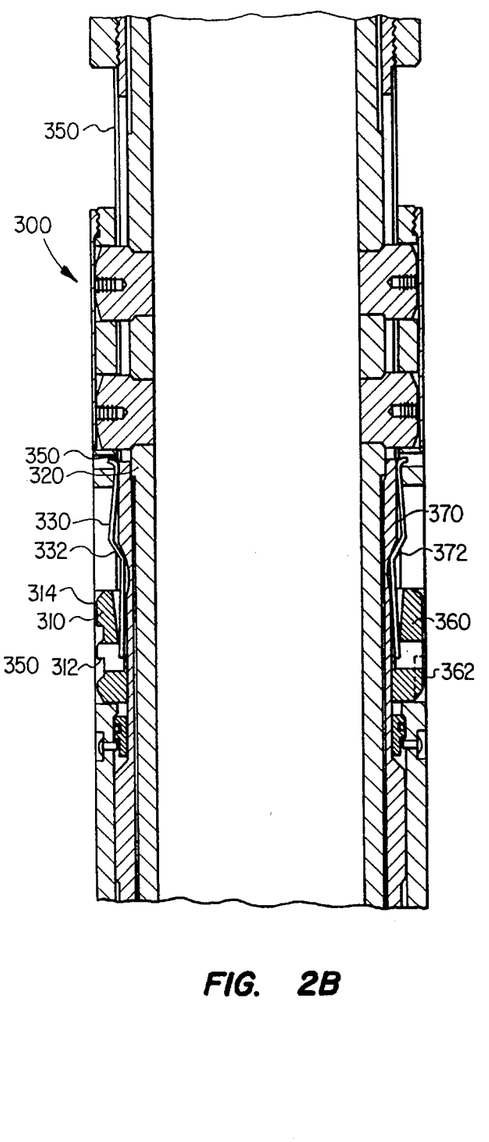
FIG. 2B illustrates an enlarged cross-sectional view of a central portion of the subterranean well flow conductor and locating and orienting subsystem of FIG. 2 wherein the locating and orienting subsystem is in an initial running mode.
Figure 2C:
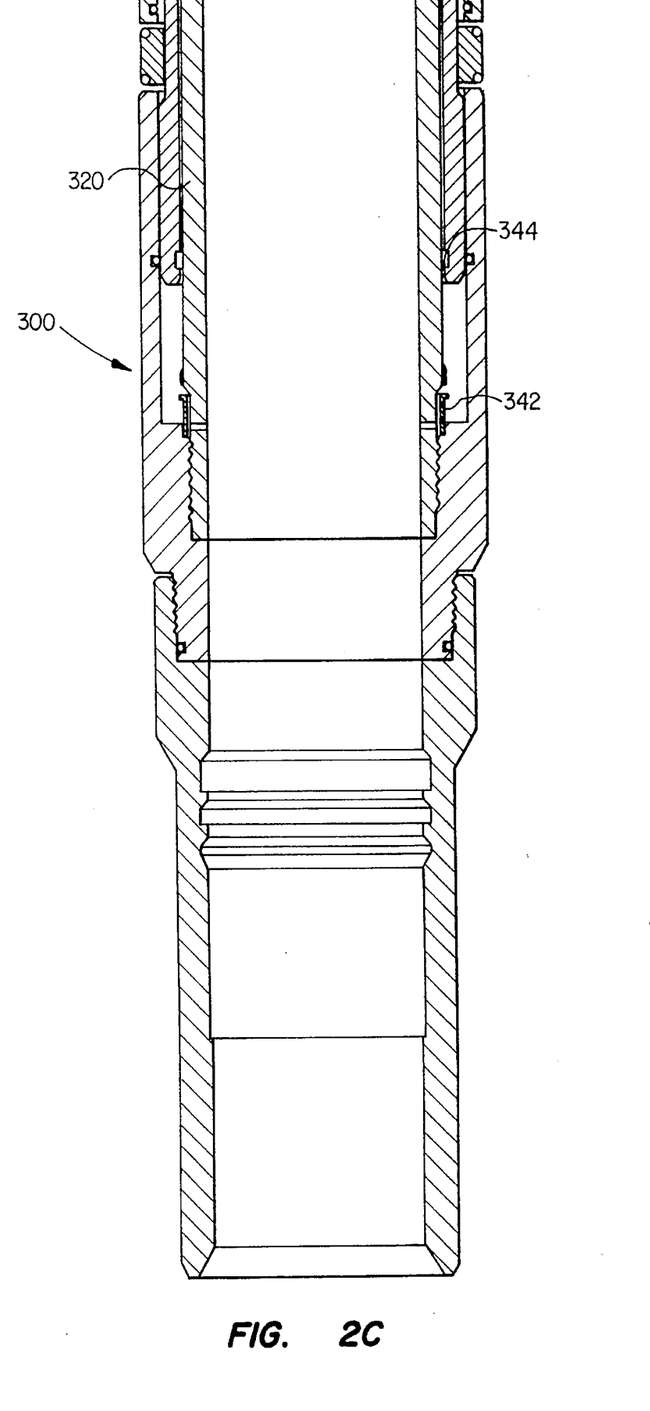
FIG. 2C illustrates an enlarged cross-sectional view of a lower portion of the subterranean well flow conductor and locating and orienting subsystem of FIG. 2 wherein the locating and orienting subsystem is in an initial running mode.

Turning now concurrently to FIGS. 2A, 2B and 2C, illustrated is an enlarged cross-sectional view of upper, central and lower portions of the subterranean well flow conductor 100 and locating and orienting subsystem 300 of FIG. 2 wherein the locating and orienting subsystem 300 is in an initial running mode.

The subsystem comprises a common mandrel 320. The common mandrel 320 has a locating key 310 and an orienting key 360 coupled thereto by first and second double-acting springs 330, 370, respectively. The common mandrel 320 is slidably coupled to an actuating mandrel 350 axially displaceable with respect thereto. The common mandrel 320, actuating mandrel 350 and first and second double-acting springs 330, 370 cooperate to yield three modes of operation for the subsystem 300.

In a first, running mode (shown in FIGS. 2A, 2B and 2C), the actuating mandrel 350 is in a first axial limit position (displaced upwards, as shown) with respect to the common mandrel 320. In this position, the actuating mandrel 350 places the first and second double-acting springs 330, 370 in a stowed position wherein the locating and orienting keys 310, 360 are retracted radially inwardly with respect to the common mandrel 320 to shield the locating and orienting keys 310, 360 from substantial contact with the surrounding well flow conductor (100 of FIG. 2) as the common mandrel 320 traverses therethrough.

In a second, locating mode, the actuating mandrel 350 is in an intermediate axial position with respect to the common mandrel 320. In this position, the actuating mandrel 350 places the first and second double-acting springs 330, 370 in a deployed position resiliently to bias the locating and orienting keys 310, 360 radially outwardly with respect to the common mandrel 320 to seek the locating and orienting profile on the inner surface of the surrounding honed bore (comprising the hollow cores of the packer 120 and the whipstock 130 of FIG. 2). More specifically, a ramped portion 352 of the actuating mandrel comes into contact with stepped portions 332, 372 or the first and second double-acting springs 330, 370. This contact rotates the first second double-acting springs 330, 370 outward into the deployed position. The keys 310, 360 are biased outward, but are not allowed actually to travel completely outward until they fully engage the locating and orienting profile.

Figure 3:
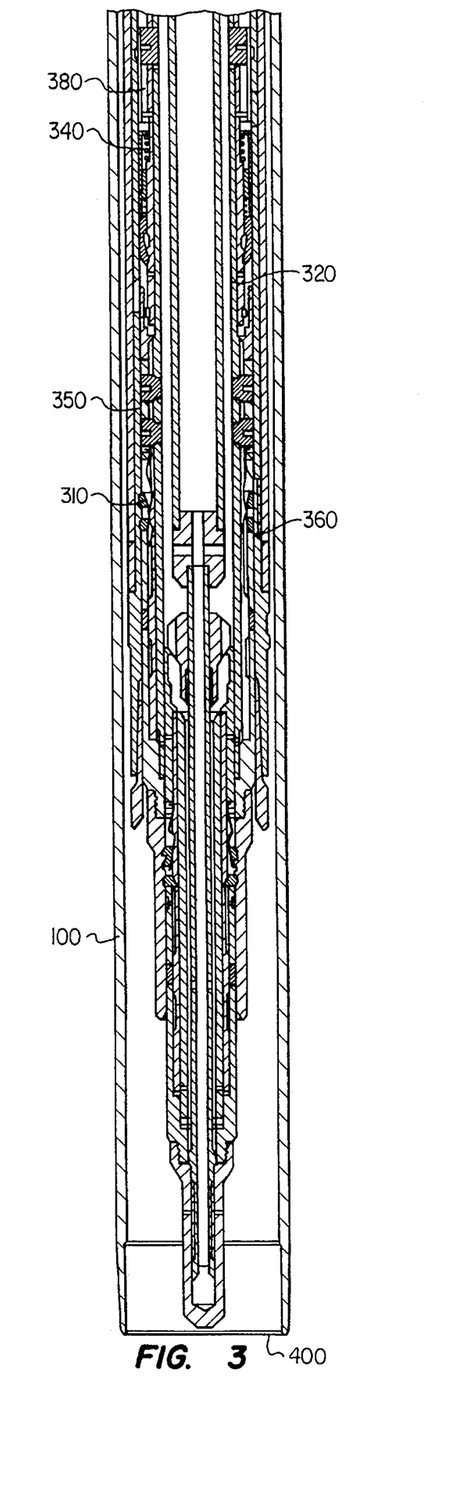
FIG. 3 illustrates a cross-sectional view through a vertical portion of a subterranean well flow conductor and locating and orienting subsystem of FIG. 2 wherein the locating and orienting subsystem is in a subsequent set mode.
Figure 3A:
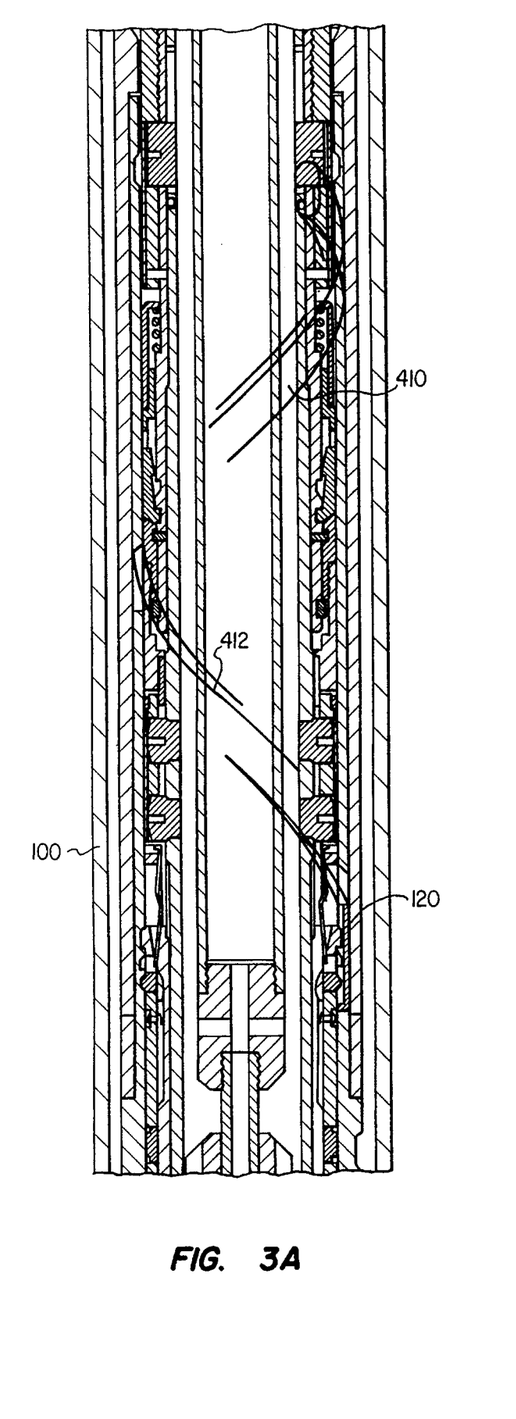
FIG. 3A illustrates an enlarged cross-sectional view of a central portion of the subterranean well flow conductor and locating and orienting subsystem of FIG. 3 wherein the locating and orienting subsystem is in a subsequent set mode.

As will be illustrated in FIG. 3A, the locating and orienting profile comprises a series of annular recesses and projections designed to engage with corresponding recesses and projections on an outer surface 312 of the locating key 310. At one location along the perimeter of the recesses and projections, an axial trench is formed. The orienting key 360, having a flat outer surface 362, is designed to fall into the axial trench, thereby ensuring orientation of the central mandrel 320 with respect to the axial trench in the landing nipple. As will also be illustrated, a helical guide wraps around a periphery of the landing nipple, leading to the axial trench. The helical guide is designed to engage the orienting key 360, drawing it toward proper engagement with the axial trench as the central mandrel 320 is moved axially.

If the central mandrel 320 is neither axially located nor radially oriented properly, neither of the keys 310, 360 will extend fully radially outward in engagement with the locating and orienting profile. If the central mandrel 320 is located but not oriented, the locating key 310 extends and engages the profile, but the orienting key 360 cannot, as the projections in the profile prevent any engagement. If the orienting key 360 is extended, but the central mandrel 320 is not located, the orienting key is in the helical guide, but the locating key cannot extend to engage the profile. Only when the central mandrel 320 is fully located and oriented can both the locating and orienting keys 310, 360 extend, allowing the subsystem 300 to transition to a set mode.

In the third, set mode, the actuating mandrel 350 is in a second axial limit position (detailed in FIG. 3A) with respect to the common mandrel 320. This set mode is only allowed when all of the keys 310, 360 are fully extended radially outward (meaning that the common mandrel 320 is both located and oriented). The ramped portion 352 of the actuating mandrel can then pass the stepped portions 332, 372 of the first and second double-acting springs 330, 370 (downward as shown), enabling the ramped portion of the actuating mandrel 350 directly to engage and stiffly retain the locating and orienting keys 310, 360 in engagement with the locating and orienting profile. When directly engaged and stiffly retained, the keys 310, 360 cannot retract radially. Therefore, the common mandrel 320 is fixed in the desired location and orientation with respect to the honed bore.

Having primarily described the interaction of the common mandrel 320, the actuating mandrel 350, the first and second double-acting springs 330, 370 and the locating and orienting keys 310, 360, an "arming" structure for placing the subsystem 300 in the locating mode will be described. With particular reference to FIG. 2A, the subsystem 300 further comprises a dog structure 390 that is coupled to the common mandrel 320 and extends radially outwardly therefrom a distance sufficient to engage the surrounding honed bore.

As the common mandrel 320 is lowered through the main well flow conductor, the diameter thereof is sufficiently large to allow the dog structure 390 to pass. However, once the common mandrel encounters the honed bore, the diameter of the honed bore is insufficient to allow the dog structure 390 to pass in its radially extended configuration. Since the common mandrel 320 is being lowered, the honed bore will engage the outer surface of the dog structure 390, forcing the dog structure upwards, as shown, until the dog structure 390 falls into a first recess 392 and thereby assumes a first radially retracted position. The common mandrel 320 continues to be lowered until the dog structure emerges from the bottom of the honed bore and again into the larger diameter main well flow conductor. Under influence of a spring 396, the dog structure 390 again assumes a radially outward position.

At this point, the common mandrel 320 is raised. This causes engagement of the re-extended dog structure 390 with the bottom of the honed bore. This time, however, the dog structure 390 is forced downward as shown, until the dog structure 390 falls into a second recess 394 and thereby assumes a second radially retracted position. A retention spring 340 is compressed when the dog structure 390 falls into the second recess 394. This compression retains the dog structure 390 in the second recess until such time as workers on the drilling rig reset the dog structure 390 manually.

As the dog structure 390 is moved into the second radially retracted position, the dog structure 390 displaces the actuating mandrel 350 from the first axial limit position into the intermediate axial position. Thus, the dog structure 390 automatically senses that the common mandrel 320 is being drawn upwards through the honed bore and causes the keys 310, 360 to deploy. The subsystem 300 is now in its locating mode.

Once the keys 310, 360 are properly engaged in the locating and orienting profile, it is time to transition the subsystem 300 into the set mode. Accordingly, the subsystem 300 further comprises an upper sleeve 380 for urging the intermediate mandrel 350 from the intermediate axial position into the second axial limit position only when the locating and orienting keys 310, 360 properly engage the locating and orienting profile. Again, the ramped portion 352 cannot slide under the keys 310, 360 until they are properly engaged.

To urge the intermediate mandrel 350 from the intermediate axial position into the second axial limit position, mass placed on the upper sleeve 380 first shears a shearable member 382 (a shear pin), thereby freeing the upper sleeve to slide axially with respect to the common mandrel. The upper sleeve 380 and the actuating mandrel move downwardly until the ramped portion 352 is radially aligned with the keys 31, 360, thereby locking them in their extended engagement.

The subsystem further comprises a lock 342 for securing the actuating mandrel 350 in the second axial limit position. The lock 342 engages a shoulder 344 on the inner diameter of the actuating mandrel 350.

If it is subsequently desired to retrieve the common mandrel 320, significant upward force on the common mandrel 320 places shear stress on shearable member 314 (a shear ring). The shearable member 314 shears, removing the ramped surface 352 from under the keys 310, 360, allowing them to disengage and retract radially inwardly for the trip to the surface.

Turning now to FIG. 3, illustrated is a cross-sectional view through a vertical portion of a subterranean well flow conductor and locating and orienting subsystem of FIG. 2 wherein the locating and orienting subsystem 300 is in the subsequent set mode. FIG. 3 is presented primarily for the purpose of establishing the relationship of the subsystem 300, detailed in FIGS. 2A–2C and a corresponding locating and orienting profile provided on the inner surface of a surrounding honed bore. Again, in the illustrated embodiment, the "surrounding honed bore" is the hollow core of the packer 120. The "surrounding honed bore" could be the hollow core of the main well flow conductor 100 or some other hollow structure into which the subsystem 300 may be inserted.

Turning now to FIG. 3A, illustrated is an enlarged cross-sectional view of a central portion of the subterranean well flow conductor 100 and locating and orienting subsystem 300 of FIG. 3 wherein the locating and orienting subsystem 300 is in a subsequent set mode.

In the illustrated embodiment, a helical guide 410 on the inner surface of the honed bore (in this case, the packer 120) engages the orienting key 360 associated with the common mandrel 320. The helical guide 410 traverses more than a complete periphery of the surrounding body. By "more than a complete periphery," "more than 360°" is meant. This ensures that, no matter the orientation of the orienting lug 360, it must engage the helical guide 410 at some point along its length. Additionally, the helical guide 410 has a sidewall 412 thereof at a non-normal angle with respect to an axis of the surrounding body to prevent a boring tool from inadvertently engaging the helical guide 410. Thus, the sidewall 412 of the helical guide 410 is sloped. This prevents the boring tool from engaging and harming the helical guide 410.

From the above, it is apparent that yet another aspect of the present invention provides a downhole-deployable locating and orienting subsystem, comprising a common mandrel having locating and orienting keys coupled thereto by first and second double-acting springs, respectively, and an actuating mandrel axially displaceable with respect thereto, the common mandrel, actuating mandrel and first and second double-acting springs cooperable to yield three modes of operation: (a) a running mode in which the actuating mandrel is in a first axial limit position with respect to the common mandrel, the actuating mandrel placing the first and second double-acting springs in a stowed position wherein the locating and orienting keys are retracted radially inwardly with respect to the common mandrel to shield the locating and orienting keys from substantial contact with a surrounding well flow conductor as the common mandrel traverses therethrough, (b) a locating mode in which the actuating mandrel is in an intermediate axial position with respect to the common mandrel, the actuating mandrel placing the first and second double-acting springs in a deployed position resiliently to bias the locating and orienting keys radially outwardly with respect to the common mandrel to seek a locating and orienting profile on an inner surface of a surrounding honed bore within the surrounding well flow conductor and (c) a set mode in which the actuating mandrel is in a second axial limit position with respect to the common mandrel, the actuating mandrel directly engaging and stiffly retaining the locating and orienting keys in engagement with the locating and orienting profile thereby to fix the common mandrel in a desired location and orientation with respect to the honed bore.

Although the present invention and its advantages have been described in detail, those skilled in the art should understand that they can make various changes, substitutions and alterations herein without departing from the spirit and scope of the invention in its broadest form.

What is claimed is:

1. A decentralizer for a diverter, comprising:

first and second substantially coaxial tubular members slidably coupled to one another to allow relative axial movement therebetween and coupled to said diverter, said first tubular member having a shoulder projecting radially outwardly from an outer surface thereof, said second tubular member having a conical ramp projecting radially outwardly from an outer surface thereof; and a decentralizing ring slidably mounted on said outer surface of said first tubular member and between said shoulder and said conical ramp, said first and second tubular members axially movable to move said shoulder and said conical ramp together, said shoulder urging said decentralizing ring onto said conical ramp, said conical ramp causing said decentralizing ring to (a) expand eccentrically from said first and second tubular members, (b) engage a well flow conductor surrounding said first and second tubular members and (c) decentralize said first and second tubular members within said well flow conductor, thereby decentralizing said diverter within said well flow conductor.

2. The decentralizer as recited in claim 1 wherein an axis of rotation of said conical ramp is parallel to, and radially offset from, an axis of said second tubular member.

3. The decentralizer as recited in claim 1 wherein said first and second tubular members are further coupled to a centralizer axially distal from said decentralizer, said centralizer and said decentralizer cooperable to misalign an axis of said first and second tubular members with respect to said well flow conductor.

4. The decentralizer as recited in claim 1 wherein said decentralizing ring is a split ring having a substantially conical inner surface and a substantially cylindrical outer surface.

5. The decentralizer as recited in claim 1 further comprising a second decentralizing ring axially offset from said decentralizing ring.

6. The decentralizer as recited in claim 1 wherein said decentralizer is coupled to a packer.

7. The decentralizer as recited in claim 1 further comprising a shear pin shearably coupling said first and second tubular members as against axial movement.

8. The decentralizer as recited in claim 1 wherein activation of a packer associated with said decentralizer causes said shoulder to move toward said conical ramp.

9. The decentralizer as recited in claim 1 wherein said diverter is a whipstock, said whipstock decentralized within said well flow conductor to protect a toppoint of said diverter from destructive contact with a drilling tool.

10. The decentralizer as recited in claim 1 wherein a packer associated with said decentralizer is capable of retaining said decentralizing ring in engagement with said well flow conductor.

11. A method of decentralizing a diverter, comprising the steps of:

axially sliding first and second substantially coaxial tubular members with respect to one another, said first and second tubular members slidably coupled to one another to allow relative axial movement therebetween and coupled to said diverter, said first tubular member having a shoulder projecting radially outwardly from an outer surface thereof, said second tubular member having a conical ramp projecting radially outwardly from an outer surface thereof; and moving a decentralizing ring slidably mounted on said outer surface of said first tubular member and between said shoulder and said conical ramp, said shoulder urging said decentralizing ring onto said conical ramp, said conical ramp causing said decentralizing ring to (a) expand eccentrically from said first and second tubular members, (b) engage a well flow conductor surrounding said first and second tubular members and (c) decentralize said first and second tubular members within said well flow conductor, thereby decentralizing said diverter within said well flow conductor.

12. The method as recited in claim 11 wherein an axis of rotation of said conical ramp is parallel to, and radially offset from, an axis of said second tubular member.

13. The method as recited in claim 11 wherein said first and second tubular members are further coupled to a centralizer axially distal from said decentralizer, said method comprising the step of misaligning an axis of said first and second tubular members with respect to said well flow conductor.

14. The method as recited in claim 11 wherein said decentralizing ring is a split ring having a substantially conical inner surface and a substantially cylindrical outer surface.

15. The method as recited in claim 11 further comprising a second decentralizing ring axially offset from said decentralizing ring.

16. The method as recited in claim 11 wherein said decentralizer is coupled to a packer.

17. The method as recited in claim 11 further comprising the step of shearing a shear pin shearably coupling said first and second tubular members as against axial movement.

18. The method as recited in claim 11 further comprising the step of activating a packer associated with said decentralizer, thereby causing said shoulder to move toward said conical ramp.

19. The method as recited in claim 11 wherein said diverter is a whipstock, said method comprising the step of decentralizing said whipstock within said well flow conductor to protect a toppoint of said diverter from destructive contact with a drilling tool.

20. The method as recited in claim 11 further comprising the step of retaining said decentralizing ring in engagement with said well flow conductor with a packer associated with said decentralizer.

21. A decentralizer for a diverter, comprising:

first and second tubular members slidably coupled to one another to allow relative axial movement therebetween and coupled to said diverter, said first tubular member having a shoulder projecting radially outwardly from an outer surface thereof, said second tubular member having an axially-offset ramp projecting radially outwardly from an outer surface thereof: and a decentralizing member slidably mounted on said outer surface of said first tubular member and between said shoulder and said axially-offset ramp, said first and second tubular members axially movable to move said shoulder and said axially-offset ramp together, said shoulder urging said decentralizing member onto said axially-offset ramp, said axially-offset ramp causing said decentralizing member to displace eccentrically from said first and second tubular members and move toward a well flow conductor surrounding said first and second tubular members to allow said decentralizer to decentralize said first and second tubular members within said well flow conductor, thereby decentralizing said diverter within said well flow conductor.

22. The decentralizer as recited in claim 21 wherein an axis of rotation of said axially-offset ramp is parallel to, and radially offset from an axis of said second tubular member.

23. The decentralizer as recited in claim 21 wherein said first and second tubular members are further coupled to a centralizer axially distal from said decentralizer, said centralizer and said decentralizer cooperable to misalign an axis of said first and second tubular members with respect to said well flow conductor.

24. The decentralizer as recited in claim 21 wherein said decentralizing member is a decentralizing ring.

25. The decentralizer as recited in claim 21 wherein said decentralizing ring is a split ring having a substantially a conical inner surface and a substantially cylindrical outer surface.

26. The decentralizer as recited in claim 21 wherein said decentralizer is coupled to a packer.

27. The decentralizer as recited in claim 21 further comprising a shear pin shearably coupling said first and second tubular members as against axial movement.

28. The decentralizer as recited in claim 21 wherein activation of a packer associated with said decentralizer causes said shoulder to move toward said axially-offset ramp.

29. The decentralizer as recited in claim 21 wherein said diverter is a whipstock, said whipstock decentralized within said well flow conductor to protect a toppoint of said diverter from destructive contact with a drilling tool.

30. The decentralizer as recited in claim 21 wherein a packer associated with said decentralizer is capable of retaining said decentralizing member in engagement with said well flow conductor.

\* \* \* \* \*